United States Patent [19]

Riley

[11] Patent Number: 4,635,160
[45] Date of Patent: Jan. 6, 1987

[54] TRI-PLANE TRANSIENT VOLTAGE SUPPRESSION DEVICE ASSEMBLY

[75] Inventor: Leon H. Riley, Huntsville, Ala.

[73] Assignee: The United States of America as represented by the Secretary of the Army, Washington, D.C.

[21] Appl. No.: 797,345

[22] Filed: Nov. 12, 1985

[51] Int. Cl.⁴ .............................................. H02H 9/04
[52] U.S. Cl. .................................... 361/111; 361/117
[58] Field of Search .................. 361/1, 111, 117, 119, 361/126, 127, 394; 337/28, 29, 32, 33, 34

[56] References Cited

U.S. PATENT DOCUMENTS 4,326,232 4/1982 Nishiwaki ........................... 361/117

Primary Examiner—A. D. Pellinen
Assistant Examiner—H. L. Williams
Attorney, Agent, or Firm—Freddie M. Bush; Robert C. Sims

[57] ABSTRACT

This Transient Voltage Suppression Device Assemblies (TVSDA) adequately provides for the parasitic inductance of the voltage suppression device (VSD). This TVSDA provides for one connector to be mounted in a plane at each end of the assembly. This mounting arrangement enables bulkhead mounting of the TVSDA. VSD's are connected, in a low parasitic inductance fashion, between leads interconnecting separate connector pins and the body of the TVSDA.

4 Claims, 2 Drawing Figures

TRI-PLANE TRANSIENT VOLTAGE SUPPRESSION DEVICE ASSEMBLY

DEDICATORY CLAUSE

The invention described herein may be manufactured, used, and licensed by or for the Government for governmental purposes without the payment to me of any royalties thereon.

RELATED APPLICATIONS

U.S. application Ser. No. 801,024, filed Nov. 22, 1985, and Ser. No. 778,941, filed Sept. 23, 1985, are copending.

BACKGROUND OF THE INVENTION

Present Transient Voltage Suppression Device Assemblies (TVSDA) do not adequately provide for the parasitic inductance of the individually installed Voltage Suppression Device (VSD). VSD lead length must be maintained as short as possible, so that the VSD can provide high frequency or high rate of rise voltage suppression. This invention provides for a TVSDA such that VSD lead length and associated inductance is reduced to a minimum. Its performance is estimated at least 10 times better than any existing TVSDA when suppressing electrical transients with rise times greater than 1.0 microsecond.

This invention has the following advantages over previous assemblies of this type.

(1) The mounting of the VSD is such that minimum VSD lead length is required.

(2) Assembly and maintenance of the TVSDA is simplified by providing access into the interior of the assembly after removing a single cover.

(3) The assembly is lighter, requires less volume and fewer parts than similar assemblies known to be available at this time.

(4) The assembly may be bulkhead mounted. This enables it to serve as the input and/or output connector for a system or subassembly.

(5) The assembly provides for installation of multiple VSD's semiconductor, gas discharge and variable resistance devices may be installed in any combination on any of the circuits passing through the TVSDA. Filtering may be installed with limited efficiency.

SUMMARY OF THE INVENTION

The present transient voltage suppression device assemblies do not adequately provide for the elimination of parasitic inductance of the individually installed Voltage Suppression Device (VSD). This TVSDA provides for one connector to be mounted in planes at each end of the assembly. This mounting arrangement enables bulkhead mounting of the TVSDA. VSD's are connected, in a low parasitic inductance fashion, between leads interconnecting separate connector pins and the body of the TVSDA. The TVSDA has the following objects:

(1) A minimum VSD lead length for their installation.
(2) Assembly and maintenance of the TVSDA simplification.
(3) Lighter, smaller and fewer parts than similar prior designed assemblies.
(4) Bulkhead mounted, enabling it to be used as an input and/or output connector for a system or subassembly.
(5) Use of a wide variety of VSD's which may be used in each circuit either singularly or in multiples in any combination.

DESCRIPTION OF THE BEST MODE AND PREFERRED EMBODIMENT

Figure 1B:
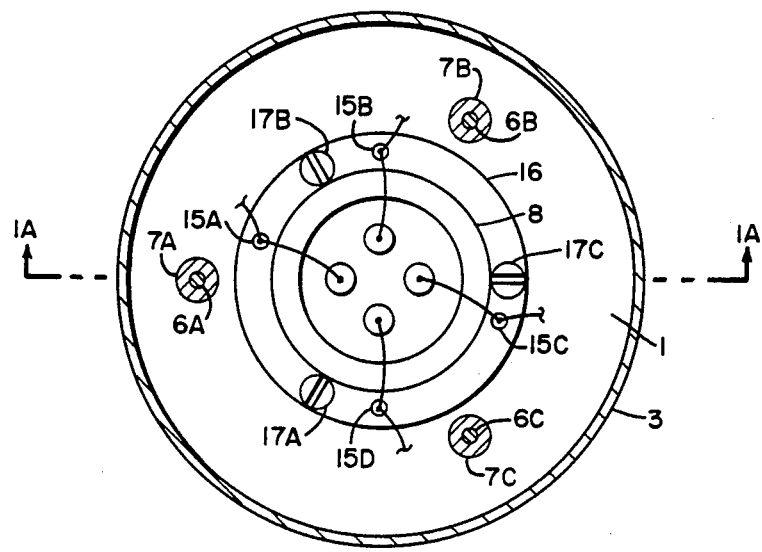
FIG. 1B is a sectional top view of FIG. 1A along lines B—B.
Figure 1A:
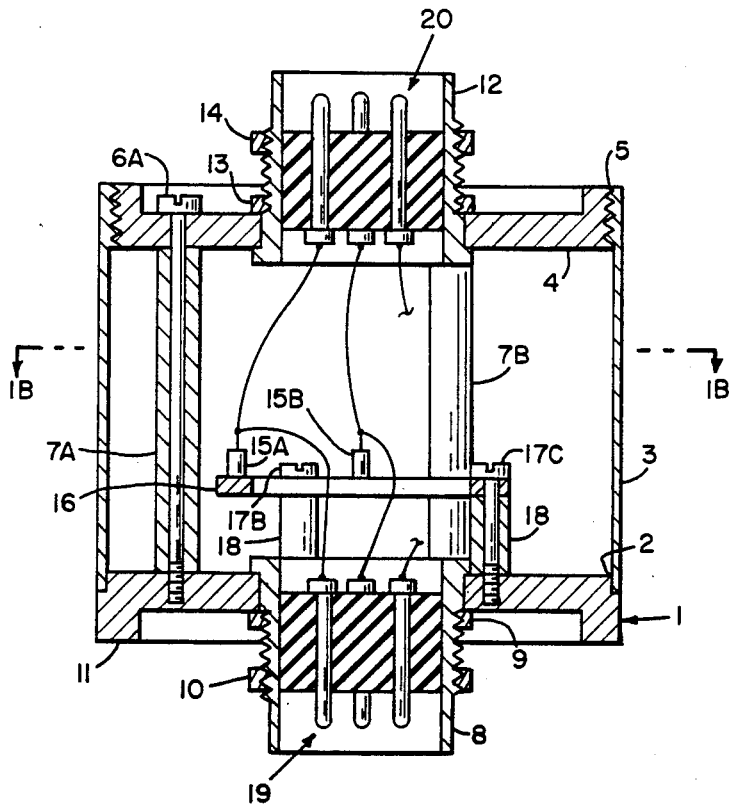
FIG. 1A is a transient voltage suppression device in accordance with the present invention, shown in section.

The TVSDA and its operation is described in the following discussion and attached figures. FIGS. 1A and 1B show a Dual Plane TVSDA. Side view A—A and top view B—B are shown. Sections are provided for greater clarity of the figures.

Referring to FIGS. 1A and 1B, the following is a description of the TVSDA. The dual plane refers to the two electrically conductive circular disks that serve as input base plate (IBP) and output base plate (OBP) for the assembly. IBP 1 is shown slotted at 2 to accept a cylindrical cover 3. The OBP 4 has a thread connection 5 to accept the cover 3. Advancing this connection 5 causes compression between 1 and 3 that can provide electrical conduction at this joint. This compression is transfered as tension to the base plate connecting screws 6A-6C. Spacing between base plates is accurately maintained by tube stand off's 7A-7C. A multipin connector 8 is shown passing through the IBP. Connectors are not necessary. Single or multiconductor cables may be passed into and/or out of the assembly with restraints at or in the assembly. A jam nut connector 8 is shown at the IBP 1. A cross section of the IBP fastening jam nut 9 is shown. Flange mount or other type connectors may be used. A second jam nut 10 is shown for attaching the TVSDA to a bulkhead for feedthrough utilization or to any system common (ground) fixture. The bulkhead or fixture is grasped between the jam nut 10 and the flat exterior ring 11 of the IBP 1. Other type mounting fixtures may be utilized. The TVSDA may be drilled and taped at any location for attachment of system common (ground) and mounting straps.

A multipin jam nut connector 12 is shown passing through the OBP 4. A cross section of the jam nut 13 is shown. Flange or other type connectors may be used. A second jam nut 14 can provide for mounting and grounding the TVSDA at OBP 5 similar to that described for the IBP 1.

The VSD's are shown mounted to an electrically conductive base 16. This base 16 is attached to the IBP 1 by conductive screws 17A-17C and tube standoff's 18A-18C. The base 16, screws 17 and tube stand offs 18 are not necessary when the VSD's are mounted directly to the IBP 1. This variation is not shown. The VSD's 15 and other hardware 16, 17 and 18 may be mounted to the OBP 4 in any of the ways described above for the IBP 1.

Electrical operation for this feedthrough device may be described by following one of the circuits. Normal operation provides passage of electrical current through pin 19 to VSD 15A to pin 20. Normally the VSD 15A would not electrically influence the circuit, but when an over-voltage occurs at the VSD 15A it will change impedance and shunt electrical energy away from the circuits it is protecting. The shunted energy will be transfered to the ground or system common through 16, 17, 18, 1 and the bulkhead or grounding fixture not shown. The electrical circuits down stream electrically from the TVSDA are thereby protected.

I claim:

1. A feed-through transient over-voltage suppression device comprising first and second electrical conductive plates; enclosure means attached to said plates so as to create a protected enclosure between said plates; an electrical conductive base positioned in said enclosure and being electrically connected to at least one of said plates; a plurality of connectors passing from outside said enclosure through said first plate to inside said enclosure and back outside through said second plate; a plurality of voltage protection means equal in number to the number of conductors for protecting against transient voltage; said protection means having first and second electrical sides and being mounted to said base such that the first side is electrically connected to said base; and the second side of each protection means being electrically connected respectively to a different conductor inside said enclosure so as to shunt electrical energy from the conductor to the base when a transient voltage occurs; thereby preventing electrical energy from feeding back outside through said second plate.

2. A device as set forth in claim 1 wherein each electrical conductive plate has an opening therethrough; insulation means provided in each opening; and said plurality conductors passing through said insulation means so as to provide for connections inside said enclosure by said voltage protection means.

3. A device as set forth in claim 2 wherein said first and second electrically conductive plates are located at first and second planes, and said base is located in a third plane.

4. A device as set forth in claim 3 wherein said plates are circular disks, and said enclosure means is a cylinder which is threaded to one plate.

* * * * *